United States Patent

Bath

[15] 3,675,080

[45] July 4, 1972

[54] LARGE GENERATOR PROTECTIVE RELAYING SCHEME

[72] Inventor: Duncan Thomas Bath, Peterborough, Ontario, Canada

[73] Assignee: Canadian General Electric Company Limited, Toronto, Ontario, Canada

[22] Filed: Sept. 21, 1971

[21] Appl. No.: 182,358

[30] Foreign Application Priority Data

Feb. 24, 1971 Canada..................................106,117

[52] U.S. Cl. .............................................317/13 R, 317/26
[51] Int. Cl. ......................................................H02h 7/06
[58] Field of Search ................................317/13 R, 27 R, 26

[56] References Cited

UNITED STATES PATENTS

| | | | |
|---|---|---|---|
| 1,903,001 | 3/1933 | Jonas | 317/13 R |
| 3,107,318 | 10/1963 | Lytle | 317/13 R |
| 3,496,414 | 2/1970 | Logston | 317/13 R |

*Primary Examiner*—James D. Trammell
*Attorney*—John J. Kissane et al.

[57] ABSTRACT

A scheme for protecting a large dynamoelectric machine, such as a waterwheel generator, against internal failure in an A.C. winding is disclosed. For a machine having its A.C. winding formed in at least two three phase star-connected circuits, the neutrals of each being connected generally together and to ground and the free ends of corresponding phases of each being connected together and to line terminals, a preferred form of the scheme consists of a first current transformer connected between one pair of neutrals. When this transformer senses an inter-neutral current above the normal value of inter-neutral current, a relay connected across it is actuated to initiate disconnecting the machine. Another current transformer may be connected between the neutrals and ground which similarly operates another relay upon sensing a substantial current flowing through it. Further current transformers are placed in each phase of the circuits. The outputs of those in corresponding phases are connected in parallel and differentially across the output of the current transformer in the respective line. A further relay is connected across this parallel arrangement to initiate disconnecting the machine when there is a flow of current through it.

9 Claims, 4 Drawing Figures

PRIOR ART

*INVENTOR.*
DUNCAN T. BATH.

LARGE GENERATOR PROTECTIVE RELAYING SCHEME

This invention generally relates to a scheme for protecting a large dynamoelectric machine against internal failure in an A.C. winding.

Conducting high currents in the stator winding around the end section in dynamoelectric machines such as large low speed waterwheel generators presents some very real problems. Recently, efforts have been made to reduce some of the physical mass of end-connections in these large machines to effect economies in both material and space. Since forming the winding neutral in one unique location requires a considerable amount of physical connections, one possible modification is to form individual circuit neutrals physically close in the winding and then connect each neutral together to form the winding neutral. The use of separate neutrals has occurred previously, particularly in smaller industrial-sized machines. However, since the requirements for protective relaying in the smaller machines are different from those for the large machines, this revamping limits some of the traditional protective relaying schemes for large machines but, at the same time, opens up new opportunities for protective relaying in this area.

Accordingly, it is an object of this invention to provide a simple protective scheme for the revamped winding arrangement which satisfies the protective relaying requirements for the machine.

According to one embodiment of this invention for a large dynamoelectric machine having its A.C. winding arranged in at least two three phase star-connected circuits, the neutrals of each being connected generally together and to ground and the free ends of corresponding phases of each being connected together and to line terminals, the protective scheme comprises at least one current transformer connected between a pair of neutrals which actuates a relay to initiate disconnecting the machine when the current between the neutrals exceeds the normal value of current between them; a current transformer connected between ground and the neutrals which actuates another relay to initiate disconnecting the machine when there is significant current flowing through it; and current transformers in each phase of the circuits, the output of transformers in corresponding phases being connected in parallel, differentially across the output of a current transformer in the respective line and across a further relay which initiates disconnecting the machine when there is a current flow through it.

Other objects and features of this invention are readily apparent from a reading of the specification when taken in conjunction with the drawings in which.

Figure 1:
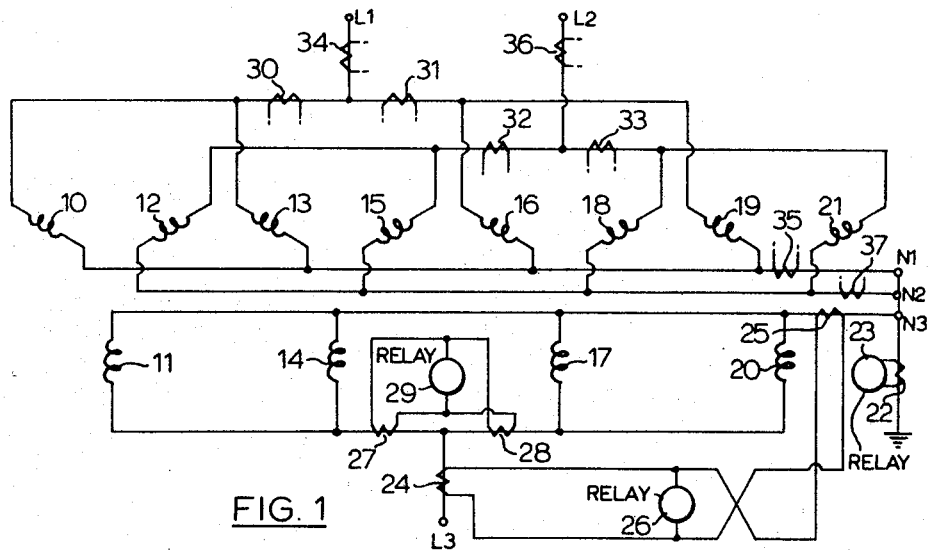
FIG. 1 is a simple schematic drawing illustrating a prior art arrangement of the A.C. winding and corresponding protective relaying scheme.

In the prior art arrangement shown in FIG. 1, coils numbered 10 through 21, inclusive each represent a group of coils of one or more turns in the A.C. winding of the machine. The inner ends of coils 10, 13, 16 and 19 in the same phase are connected together and to a neutral point N1. The outer ends of each of these coils are connected together and to a line L1. Similarly coils 12, 15, 18 and 21 are connected to N2 and L2, respectively, and coils 11, 14, 17 and 20 are connected to N3 and L3, respectively. Since N1, N2 and N3 are connected together, they form a unique neutral for the winding. It can be seen from the drawing that forming of the generator neutral in one unique location requires a considerable amount of physical connections in order to conduct the neutral-end currents to the common point. In terms of economies in both dollar cost and space requirements, this arrangement appears undesirable for many of the larger machines. The drawing also illustrates a typical protective relaying scheme for the machine winding. First the winding neutral is connected to ground through a current transformer 22. This transformer, upon sensing a significant current flowing through it, will operate a relay 23 to initiate disconnecting of the machine. Usually a winding fault develops originally as a ground from a phase winding, such as coil 10 for example, to the frame of the machine. If the neutral is not grounded, a fault of this sort will not unbalance the phase current and it is therefore rather difficult to locate until it has developed into a phase-to-phase short circuit. Hence, it is desirable to have the neutral grounded to protect the machine from ground faults no matter what type of winding formation is used. By saying that the relay 23 initiates disconnecting of the machine, it should be understood that the relay merely actuates a tripping circuit which in turn trips the main circuit breaker, interrupts the field circuit and in the case of waterwheel driven machines, initiates other shut-down procedures. Additional current transformers 24 and 25 are shown connected in line L3 and the conductor to point N3, respectively. Their outputs are connected differentially as shown and another relay 26 is connected across the two. This protective scheme is known in the art as differential protection. The current flowing in line L3 is balanced against the current flowing in the conductor to point N3. Any current diverted through relay 26 as a result of an internal fault will operate the relay and initiate disconnecting of the machine in the manner previously described. Although this scheme protects against ground faults if the neutral is grounded and phase-to-phase short circuits, it does not protect against open circuit or short-circuited turn conditions. Therefore, the so-called split-conductor protective scheme is shown in combination with the differential scheme. As shown by the connection of current transformers 27 and 28 and relay 29, this scheme is merely a variation of the differential principle in which the currents in the two halves of the phase winding are balanced against each other instead of having the current in one end of the phase winding balanced against that out the other end. The addition of this scheme, however, has made it possible to detect both conditions not sensed by the differential arrangement alone. Current transformers 30, 31 and 32, 33 are each connected similar to transformers 27, 28 for protection of the other two phases although for the purposes of this drawing the transformers only have been shown. Similarly, current transformers 34, 35 and 36, 37 are connected like transformers 24, 25 although there too only the transformers have been shown.

Figure 2:
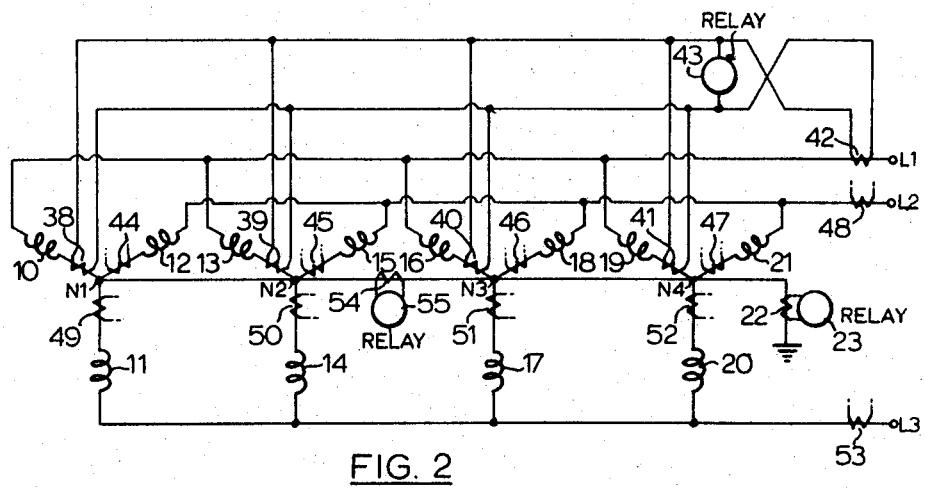
FIG. 2 is a schematic drawing of the invention showing the protective relaying scheme with the proposed winding formation.

The schematic drawing in FIG. 2 illustrates a novel protective relaying scheme for the revamped winding formation shown therein. Coils numbered 10 through 21 inclusive once again represent at least one coil of one or more turns in the A.C. winding of the machine. However, the inner ends of coils 10, 11 and 12 are now connected together at neutral point N1 forming one star-connected circuit. Similarly, the inner ends of coils 13, 14, 15, coils 16, 17, 18 and coils 19, 20, 21 are connected together at neutral points N2, N3 and N4, respectively, forming three more three phase star-connected circuits in the winding. Although four circuits have been shown in the drawing, other circuit combination could be used. The number, of course, will depend upon the current requirements for the machine. The outer ends of each coil in the same phase of the circuits are connected together by three lines L1, L2 and L3 as shown. The individual neutral points N1, N2, N3 and N4 are connected together also to form the winding neutral. One of the neutrals, N4 in the drawing, is then usually connected to ground through a current transformer 22. Transformer 22 and relay 23 serve the same purpose as these elements shown in FIG. 1. From the viewpoint of protection, it is considered advisable to always have the neutral grounded. In addition current transformers 38, 39, 40 and 41 are shown connected in the same phase of each circuit. Their outputs are connected in parallel and differentially across the output of a current transformer 42 connected in line L1. This protective scheme is another variation of the differential protection scheme discussed previously. Here the currents in like phases are summed and balanced against the current in the corresponding line. Any differences due to ground faults or phase-to-phase faults in the winding will result in current being diverted through another relay 43. This relay in turn will be actuated and thereby initiate disconnecting of the machine as previously discussed. Current transformers 44, 45, 46 and 47 are connected similarly to current transformer 48 in line L2 as are transformers 49, 50, 51 and 52 to current transformer 53 in line L3 although these transformers have been left unconnected for the sake of simplicity in the drawing. With the protective scheme disclosed so far for the winding formation shown in FIG. 2, the machine is still not protected against open circuit or short-circuited turn conditions in the winding. Although the latter condition often quickly becomes a ground fault, it is desirable to detect any fault condition as quickly as possible to minimize the damage to the machine. Therefore, to complete the protective system, a current transformer 54 is shown connected between individual neutrals N2 and N3. A relay 55 is then connected across the output of the transformer. Under normal operating conditions, there will be only a small current flowing between the neutrals due to slight differences in the electrical characteristics of each circuit. Transformer 54 and relay 55 provide fault protection for the winding equivalent to that provided by the split-conductor scheme shown in FIG. 1. Conditions, such as short-circuited turn faults, that will normally excite a current transformer in the split-conductor configuration will also cause current in excess of the normal inter-neutral current to flow in transformer 54. Relay 55 will be set to operate for neutral currents above the normal current flowing between neutrals N2 and N3, as mentioned previously and thereupon initiate disconnecting of the machine. In addition to sensing internal faults in any phase, transformer 54, of course, also senses ground fault conditions in the machine. If there are many circuits and therefore, many individual neutrals in the machine, adequate fault protection can be attained without a current transformer, such as transformer 54, between all the adjacent neutrals. As illustrated in FIG. 2, one transformer 54, shown between neutrals N2 and N3, is, in fact, sufficient. Where one transformer 54 is used, it will generally be placed between adjacent neutrals with the lowest normal inter-neutral current so that relay 55 may be the most sensitive possible.

Figure 3:
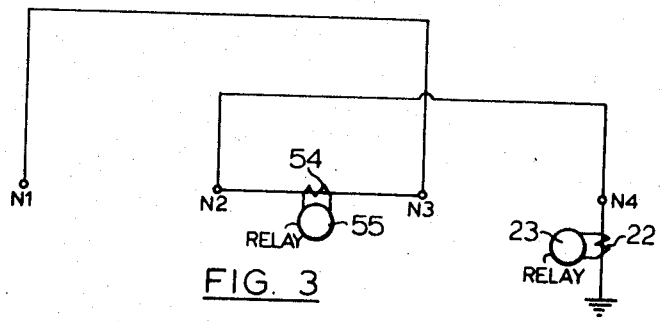
FIG. 3 is an abbreviated drawing of the protective relaying scheme shown in FIG. 2 for a slightly different manner of connecting the individual neutral points together in the A.C. winding.

FIG. 3 is meant to illustrate the protective relaying scheme of FIG. 2 used with a modified form of the winding formation shown therein. In FIG. 3 neutral points N1 to N4, inclusive, correspond to neutrals N1 to N4 in FIG. 2. Although the rest of the winding arrangement has not been shown, except for the manner of connecting these neutral points, it is assumed to be the same as the arrangement in FIG. 2. Similarly, although only two of the three forms of protective relaying means shown in FIG. 2 have been included in FIG. 3, the differential protective means shown in FIG. 2 is also assumed to be included in the complete protective scheme for this winding. As shown in FIG. 3, neutral point N1 is now connected to point N3 while neutral point N4 is now connected to point N2. Where the number of circuits is four or more, and especially where it is even, there is a technical advantage in selecting odd numbered neutrals for connection to one-half of the neutral bus and even numbered neutrals for connection to the other half with transformer 54 inserted in the conductor joining the two halves as shown in FIG. 3. Of course, with an odd number of circuits the term half is only approximately correct. The reason for preferring this arrangement in many cases is that, due to inevitable eccentricities in machine construction, there tends to be a normal exchange of current between the various neutrals with no winding faults, as has been mentioned previously. The highest values for these normal circulating currents will be between winding elements located 180° from each other in the machine. Therefore, if these neutrals are connected together in such a way as not to involve the transformer 54 and relay 55 combination, the latter can be designed and adjusted for greater sensitivity. Furthermore, since inter-winding faults, as opposed to faults involving ground, are most likely to occur between parts of the winding physically close to one another, for example between circuits associated with say N1 and N2, the particular connection of groups of neutrals as mentioned tends to channel the neutral fault currents through the connection containing elements 54 and 55.

Figure 4:
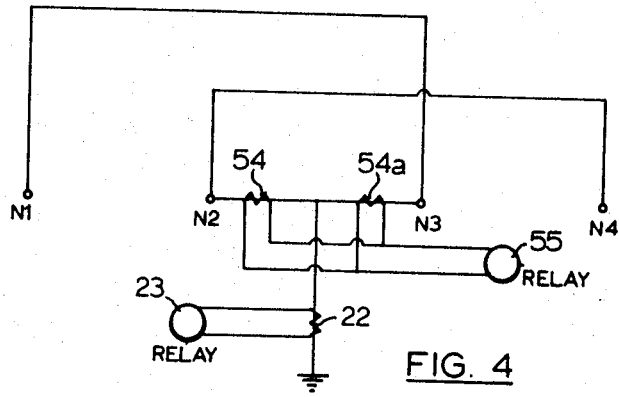
FIG. 4 is a drawing with the winding arrangement modified as shown in FIG. 3 but showing one possible modification of the relaying scheme shown in that Figure and FIG. 2.

FIG. 4 shows a different connection to ground in the protective scheme for the modified winding arrangement illustrated in FIG. 3. With this connection, a ground fault involving any circuit associated with any of the neutrals will cause ground fault current to flow through either transformers 54 or 54a. Therefore, in addition to detecting neutral current exchanges in the case of non-ground winding faults, as described in reference to FIG. 3, elements 54 and 54a and element 55 can be used as a full back-up for elements 22 and 23 or a replacement for them.

Accordingly, there has been disclosed a novel protective relaying scheme for an A.C. winding of a large dynamoelectric machine. From the standpoint of generating power, there appears to be no difference between the winding arrangements in FIGS. 1 and 2. However, since the protective relaying scheme shown in FIG. 1 cannot be used directly with the preferred winding arrangement in FIG. 2, the scheme disclosed herein opens up new opportunities for protective relaying in large machines.

The embodiments of the invention in which an exclusive property or privilege is claimed are defined as follows:

1. A protective scheme for a large dynamoelectric machine having its A.C. winding formed in at least two three phase star-connected circuits, a first conductor connecting the neutrals of each of said circuits together in a particular order, a second conductor connecting said first conductor to a ground terminal, and lines connecting the free ends of corresponding phases of each of said circuits together, said scheme comprising one or more current sensing means connected in said first conductor between at least one pair of said neutrals; first control means connected to said sensing means for initiating disconnecting said machine when the current sensed is above a normal value; further current sensing means connected in each of said lines; individual current sensing means connected in each phase of said circuits, the outputs of said individual sensing means in corresponding phases being connected in parallel and differentially across the output of said further sensing means in the respective line; and further control means connecting across said further and individual sensing means for initiating disconnecting said machine when there is a current flow through said control means.

2. The protective scheme according to claim 1 in which said neutrals are progressively connected together in order of their physical occurrence in said machine by said first conductor.

3. The protective scheme according to claim 2 in which there is one of said current sensing means connected in said first conductor between the pair of said neutrals with the lowest normal inter-neutral current.

4. The protective system according to claim 1 in which said neutrals are numbered in order of their physical occurrence in said machine and progressively connected together in order of the odd numbered neutrals followed by the even numbered neutrals by said first conductor.

5. The protective system according to claim 4 in which there is one of said current sensing means connected in said first conductor between said odd and even numbered neutrals.

6. The protective system according to claim 4 in which there are two of said current sensing means connected in said first conductor between said odd and even numbered neutrals.

7. The protective system according to claim 6 in which said second conductor is connected to said first conductor between said current sensing means.

8. The protective system according to claim 7 in which a current transformer is connected in said second conductor and a simple relay is connected across said transformer for disconnecting said machine when significant current is sensed in said second conductor.

9. The protective system according to claim 8 in which all said current sensing means are current transformers and all said control means are simple relays.

* * * * *